United States Patent [19]
Lui

[11] Patent Number: 5,906,111
[45] Date of Patent: May 25, 1999

[54] LIQUID COOLED HIGH PRESSURE SEPARATION FOR AIR CYCLE COOLING SYSTEM

[75] Inventor: Clarence Lui, Diamond Bar, Calif.

[73] Assignee: AlliedSignal Inc., Morristown, N.J.

[21] Appl. No.: 09/010,201

[22] Filed: Jan. 21, 1998

Related U.S. Application Data

[60] Provisional application No. 60/052,906, Jul. 11, 1997.

[51] Int. Cl.$^6$ ........................................................ F25D 9/00
[52] U.S. Cl. ................................................ 62/402; 62/172
[58] Field of Search ........................................ 62/172, 402

[56] References Cited

U.S. PATENT DOCUMENTS

| | | |
|---|---|---|
| Re. 32,100 | 4/1986 | Rannenberg . |
| 3,208,234 | 9/1965 | Messinger ................................ 62/172 |
| 4,198,830 | 4/1980 | Campbell . |
| 4,263,786 | 4/1981 | Eng ........................................ 62/402 X |
| 4,430,867 | 2/1984 | Warner . |
| 4,963,174 | 10/1990 | Payne . |
| 4,966,005 | 10/1990 | Cowell . |
| 4,967,565 | 11/1990 | Thomson . |
| 5,086,622 | 2/1992 | Warner . |

*Primary Examiner*—Christopher B. Kilner
*Attorney, Agent, or Firm*—Robert Desmond, Esq

[57] ABSTRACT

An environmental control system includes an air cycle subsystem and a liquid cycle subsystem. The air cycle subsystem includes a liquid-to-air condenser, a liquid-to-air reheater downstream of the condenser, and a turbine downstream of the reheater. The liquid cycle subsystem is in heat exchange relationship with the air cycle subsystem, with the liquid cycle subsystem comprising the condenser, the reheater, a first liquid-to-air heat exchanger, and a second liquid-to-air heat exchanger. The heat exchange relationship occurs at the condenser and the reheater.

23 Claims, 1 Drawing Sheet

LIQUID COOLED HIGH PRESSURE SEPARATION FOR AIR CYCLE COOLING SYSTEM

CROSS-REFERENCE TO RELATED APPLICATIONS

The present application claims the benefit of U.S. Provisional Application Ser. No. 60/052,906, filed Jul. 11, 1997.

BACKGROUND OF THE INVENTION

The present invention generally relates to environmental control systems (ECSs) and air cycle cooling systems (ACCSs). More specifically, the present invention relates to an improved ACCS and improved method of conditioning water vapor compressed air and recovering wasted energy from a liquid load, while reducing the system size and improving water removal efficiency.

ACCSs are used to provide a supply of conditioned air to an enclosure, such as an aircraft cabin and cockpit. In the past, ACCSs have utilized an air-to-air cycle cooling system with an integrated liquid loop. But the liquid loop has been primarily for the purpose of cooling radar or other avionics, not for the air to be conditioned. In such systems, a flow of bleed air is taken from an intermediate or high pressure stage within a jet engine having multi-compression stages. The bleed air has usually been pre-cooled within a primary heat exchanger with heat being rejected to RAM air and then flowed to a compressor. After compression, the air has been routed through a secondary heat exchanger. Next, the air is typically flowed into an air-to-air reheater heat exchanger and then to an air-to-air condenser heat exchanger. Condensed water vapor is extracted by a water extractor, and then routed and evaporated in the RAM air supply to the secondary heat exchanger. A dehumidified air moves from the water extractor and into a turbine. An expanded air from the turbine flows through the condenser in the capacity as a coolant medium. When the air flow from the condenser passes through a liquid-o-air heat exchanger, a relatively warmer liquid from a liquid loop is cooled and then used to cool avionics. After the air flow moves through the liquid-to-air heat exchanger, the flow becomes the supply to the cabin.

Although providing advantages, the above conventional ACCS with a liquid loop has also presented disadvantages. For example, the air-to-air heat exchangers are relatively bulky and, thus, do not make the most efficient use of space. Of course, with less bulkier components, greater cooling capacity can be achieved with a given amount of space. If the ACCS is used as a retrofit, a bulkier system size means fewer opportunities for the ACCS to fit into different spaces to be retrofitted. Also, the liquid load is typically rejected directly into the cooling air supply. That means the ACCS will have to be increased in size to accommodate the load.

As can be seen, there is a need for an ACCS with a liquid loop that is small in size such that for a given space a greater cooling capacity can be achieved. There is also a need for an ACCS which, due to its relatively small size, can serve as a retrofit in more environments. Further, an ACCS is needed which can more efficiently utilize a liquid loop by also using it during the water vapor removal process of the air to be conditioned.

SUMMARY OF THE INVENTION

The present invention is directed to an improved environmental control system for conditioning water vapor bearing air for a supply while recovering otherwise wasted thermal energy and converting it into a useful form. The system comprises an air cycle subsystem comprising a liquid-to-air condenser and a liquid-to-air reheater downstream of the condenser; and a liquid cycle subsystem in heat exchange relationship with the air cycle subsystem, with the liquid cycle subsystem comprising the condenser, the reheater, a first liquid-to-air heat exchanger, and a second liquid-to-air heat exchanger, and with the heat exchange relationship occurring at the condenser and the reheater.

The invention is also directed to an improved method of conditioning water vapor bearing compressed air while minimizing system size and increasing operating efficiency of the system during water removal. Such method comprises the steps of providing an air cycle subsystem comprising a condenser, a reheater and a turbine downstream of the reheater; and placing a liquid cycle subsystem in heat exchange relationship with the air cycle subsystem, with the heat exchange relationship occurring at the condenser and the reheater.

These and other features, aspects, and advantages of the present invention will become better understood with reference to the following drawings, description, and claims.

DETAILED DESCRIPTION OF THE INVENTION

Figure 1:
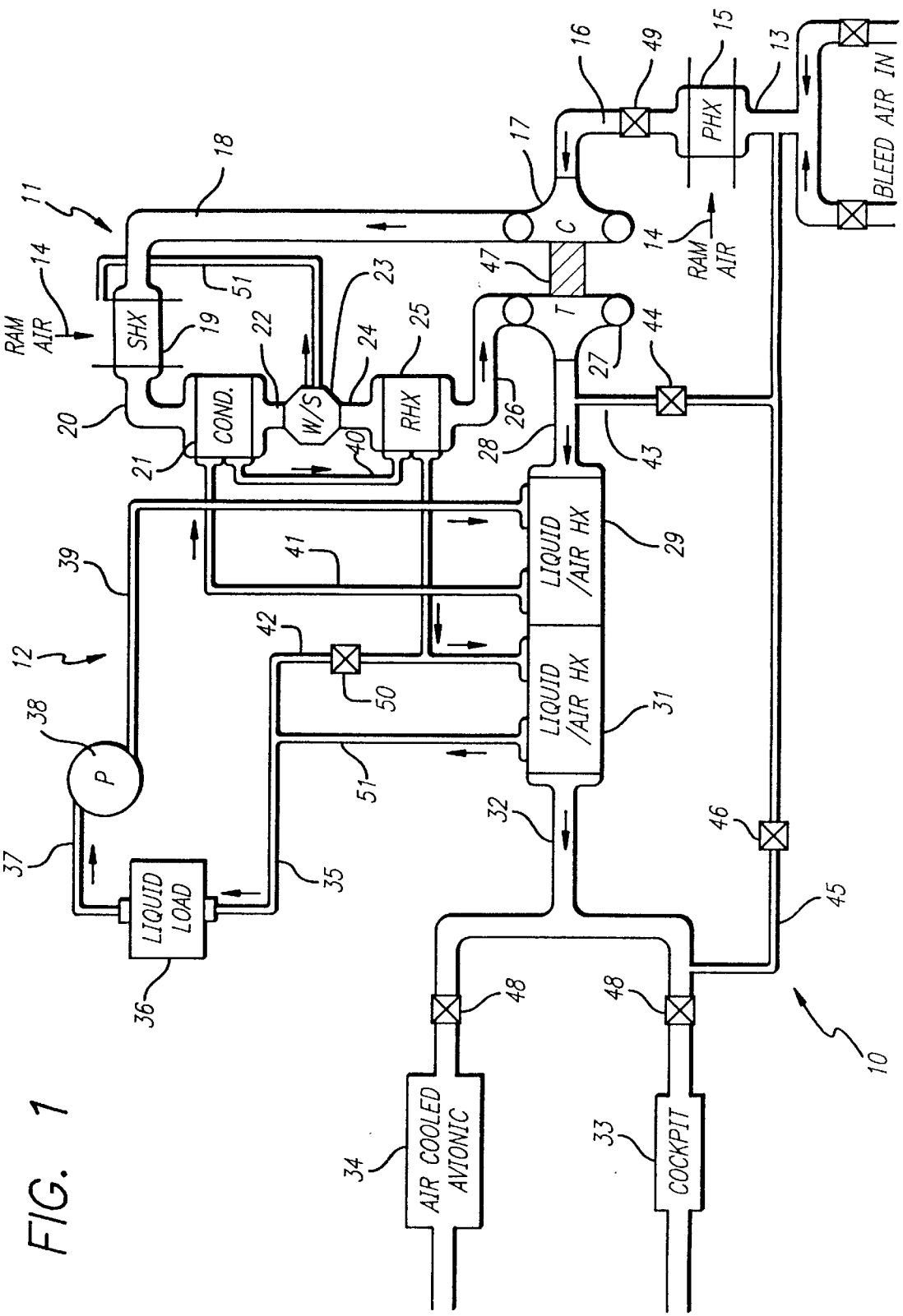
FIG. 1 is a schematic diagram of one embodiment of the present invention.

FIG. 1 schematically depicts an environmental control system (ECS) 10 according to a preferred embodiment of the present invention. The ECS 10 comprises an air cycle subsystem 11 which is in heat exchange relationship with a liquid cycle subsystem 12. The liquid cycle subsystem 12 assists in a water condensation process that is part of an overall process to condition water vapor bearing air for supply to, for example, an enclosure. More specifically, the air cycle subsystem 11 comprises a primary air-to-air heat exchanger 15, a compressor 17, a secondary air-to-air heat exchanger 19, a condenser 21, a water extractor 23, a reheater 25, a turbine 27, and first and second liquid-to-air heat exchangers 29, 31. The liquid cycle subsystem 12 includes components which also function as part of the air cycle subsystem 11. The liquid cycle subsystem 12 comprises the condenser 21, the reheater 25, the first and second heat exchangers 29, 31, and a pump 38. Through the shared components, a heat exchange relationship is established between the subsystems 11, 12.

If the selected environment for the present invention is an aircraft, the water vapor bearing air may be a bleed air 13 from a turbine engine of the aircraft. The bleed air 13 flows through the air cycle subsystem 11 while water vapor is condensed in the condenser 21 and then the condensed water vapor is extracted by the water extractor 23. The air flow is then reheated in the reheater 25 and next expanded by the turbine 27. The flow from the turbine 27 passes through the first and second liquid-to-air heat exchangers 29, 31 to become a supply 32. The liquid cycle subsystem 12 circulates a liquid coolant through the first heat exchanger 29, the condenser 21, the reheater 25, and then the second heat exchanger 31. Thereby, the bleed air 13 is conditioned for eventual supply to an enclosure, the liquid cycle subsystem 12 can cool a liquid load 36, and the overall size of the ECS 10 is reduced.

In more particularly describing the present invention, and as shown in FIG. 1, the bleed air 13 is sent through the primary heat exchanger 15 such that the bleed air 13 is in heat exchange relationship with a RAM or ambient air 14. After the bleed air 13 is cooled in the primary heat exchanger 15, a resulting pre-cooled air passes through a flow control valve 49, a duct 16 and into the compressor 17 where the air is compressed to a high pressure. A compressed air exits the compressor 17 through a duct 18 and enters the secondary heat exchanger 19 whereby further cooling of the compressed air occurs. A compressed or high pressure, water vapor bearing air exits the secondary heat exchanger 19 and flows through a duct 20.

The liquid-to-air condenser 21 receives the water vapor bearing air from the duct 20. In comparison to an equally rated, commercially available air-to-air condenser, a commercially available liquid-to-air condenser 21, such as that manufactured by the assignee of the present invention, may be approximately 30 to 40% smaller in size. In any event, the condenser 21 places such air in heat exchange relationship with the liquid cycle subsystem 12, which is more fully described below. The liquid cycle subsystem 12 serves as the coolant medium means in the heat exchange and so absorbs a heat of condensation and heat of sensible cooling. Although the ECS 10 may be optimized to absorb varying amounts of heat, the present invention contemplates that the liquid cycle subsystem 12 absorbs about 70 to 80% of the total heat that can be absorbed in the condenser 21. By such heat exchange process, the water vapor bearing air is cooled and the water vapor is condensed. What is produced thereby is a water condensed air. The water condensed air flows from the condenser 21, through a duct 22, and into the water extractor 23.

The water extractor 23 extracts substantially all of the condensed water from the water condensed air to provide a dehumidified air. It is contemplated that about 97% of the total condensed water is extracted, although the amount can vary depending upon optimization. In this embodiment, the extracted water can be flowed via a duct 51 to the secondary heat exchanger 19 for evaporation. The dehumidified air from the extractor 23 then flows through a duct 24 and into a heat recovery means, i.e., the liquid-to-air reheater 25. Like with the condenser 21, a commercially available liquid-to-air reheater 25, such as that manufactured by the assignee of the present invention, may be approximately 10 to 20% smaller in size when compared to an equally rated, commercially available air-to-air reheater. In the reheater 25, the dehumidified air is placed in heat exchange relationship with the liquid cycle subsystem 12 which now carries an absorbed heat of condensation and heat of sensible cooling from the condenser 21. Because of the heat exchange relationship, the reheater 25 not only heats the dehumidified air, but it also recovers the thermal energy from the heat generated in the liquid cycle subsystem 12. That is unlike past systems which rejected heat into the supply 32 and, thus, allowed no recovery. Again, while dependent upon optimization, the present invention contemplates that the amount of recovered thermal energy by the reheater 25 is about 20 to 30% of the total energy available for recovery in the reheater 25. The recovery in the reheater 25 occurs in a fashion whereby the recovered heat can eventually be transformed into useful energy. In this embodiment, the recovered energy is used to increase energy input to the turbine 27 and results in a higher efficiency, as further described below. As can be appreciated by those skilled in the art, the amount of recovery of the heat from the liquid cycle subsystem 12 within the reheater 25 is at least partial, with the remainder going to the supply 32. The amount of recovery is dependent upon the aircraft flight conditions and the particular liquid load 36, with higher ambient air temperatures decreasing the amount of recovery. Irrespective of the amount of recovery, the reheater 25 produces from the dehumidified air a reheated air.

The reheated air exits the reheater 25 through a duct 26 and can then flow into another heat recovery means, i.e., the turbine 27. The turbine 27 not only expands the reheated air but it also recovers some of the heat of condensation and sensible cooling in the reheated air. The recovered heat can be used by the turbine 27, for example, to increase its rotating speed, boost its pressure ratio, and increase the expansion of the reheated air. Further, and as seen in FIG. 1, the turbine 27 is mechanically engaged to the compressor 17 by means of a shaft 47. Thus, heat or energy absorbed by the turbine 27 can be converted to useful energy by the compressor 17. When the turbine 27 expands the reheated air, an expanded air is produced which flows out the turbine 27 through a duct 28.

Next, the expanded air flows through the first liquid-to-air heat exchanger 29 whereby the expanded air is warmed as a result of the heat exchange relationship between the expanded air and the liquid cycle subsystem 12. A warmed, expanded air exits the first heat exchanger 29 and directly enters the second liquid-to-air heat exchanger 31, or can indirectly enter the heat exchanger 31 through a duct disposed between the heat exchangers 29, 31. In the heat exchanger 31, the warmed, expanded air is further warmed from being in heat exchange relationship with the liquid cycle subsystem 12. From the second heat exchanger 31, the flow exits as the supply 32 which, for example, can be used as conditioned air for a cockpit 33 and/or an air cooled avionic 34.

In the event that it is desired to modulate the supply 32 for either the cockpit 33 and/or avionic 34, a pair of upstream flow control valves 48 can be actuated to regulate the amount of the supply 32. The temperature of the supply 32 can also be regulated by another flow control valve 46 by directly taking the bleed air 13 through a duct 45 such that the bleed air 13 can be mixed into the supply 32. Additional modulation of the ECS 10 can be accomplished by allowing the bleed air 13 to flow into a duct 43 and through a control valve 44 in order to warm the expanded air from the turbine 27, for example, to prevent icing.

In again referring to FIG. 1, the liquid cycle subsystem 12 is a closed system and utilizes a liquid coolant, such as polyalphaolephin (PAO), to function as a coolant medium and as a heat source. The liquid coolant circulates through the subsystem 12 and changes its function as the heat exchange relationships change, as further described below. With an arbitrary starting point, and as mentioned above, the pump 38 moves the liquid coolant through a piping 39 for receipt by the first liquid-to-air heat exchanger 29, which is also a part of the air cycle subsystem 11. The heat exchange process therein between the liquid coolant and the air cycle subsystem 11 cools the liquid. Then, the cooled liquid flows to the condenser 21 by a piping 41. In the condenser 21, the high pressure, water vapor bearing air is in heat exchange relationship with the cooled liquid. That allows the liquid cycle subsystem 12 to absorb the heat of condensation and sensible cooling which is produced from the air being cooled and water vapor being condensed in the condenser 21.

From the condenser 21, a warmed liquid flows through a piping 40 and into the reheater 25, which is also a part of the air cycle subsystem 11. Part of the absorbed heat of condensation and sensible cooling in the liquid coolant is therein rejected to the dehumidified air coming from the water extractor 23. From the reheater 25, the liquid coolant flows through a piping 42 and then either through a temperature flow control vavle 50 or the second liquid-to-air heat exchanger 31. If no further cooling of the liquid is desired, the liquid coolant can pass through the control valve 50 and into a piping 35. On the other hand, if further cooling of the liquid is desired, it can pass through the heat exchanger 31.

In the second liquid-to-air heat exchanger 31, the liquid coolant is placed in heat exchange relationship with air flow coming from the first liquid-to-air heat exchanger 29. After the liquid is thus cooled by the heat exchange process in the second heat exchanger 31, the liquid flows via a piping 51, then the piping 35 and finally to a liquid load 36 which, for example, may be a radar system or other avionics that require cooling. The liquid coolant, which has now been heated from the liquid load 36, moves through a piping 37 and back to the pump 38.

As can be appreciated, the present invention achieves a reduction in system size over previous air cycle cooling systems by utilizing liquid-to-air condensers and reheaters in place of air-to-air heat exchangers. By the use of smaller liquid-to-air heat exchangers, the overall size (i.e., packaging) of the system can be reduced, for example, by approximately 10 to 20%, in comparison to a system using air-to-air heat exchangers. Additionally, the present invention uses the liquid cycle subsystem to not only cool a liquid load and warm an air flow from the air cycle subsystem, it also uses the liquid cycle subsystem to assist in the water removal process involving the air to be conditioned. Furthermore, the present invention recovers the wasted heat from equipment so that such heat may be converted to useful energy.

It should be understood of course that the foregoing relates to preferred embodiments of the present invention and that modifications may be made without departing from the spirit and scope of the invention as set forth in the following claims.

We claim:

1. A method for conditioning water vapor bearing air for supply as conditioned air, comprising the steps of:
   providing an air cycle subsystem comprising a condenser, a reheater downstream of said condenser such that said reheater can reheat a dehumidified air, and a turbine downstream of said reheater; and
   placing a liquid cycle subsystem in heat exchange relationship with said air cycle subsystem, said heat exchange relationship occurring at said condenser and said reheater such that said reheater can recover thermal energy from said liquid cycle subsystem and provide a recovered thermal energy for use by said turbine.

2. The method of claim 1, wherein said condenser is a liquid-to-air heat exchanger.

3. The method of claim 1, wherein said reheater is a liquid-to-air heat exchanger.

4. The method of claim 1, wherein said liquid cycle subsystem comprises said condenser and said reheater.

5. The method of claim 4, wherein said liquid cycle subsystem comprises said condenser upstream of said reheater.

6. A method of conditioning water vapor bearing air for supply as conditioned air and cooling a liquid load, comprising the steps of:
   providing an air cycle subsystem comprising a condenser, a reheater downstream of said condenser, a turbine downstream of said reheater such that said turbine can recover heat of condensation and heat of sensible cooling from said reheater, a first liquid-to-air heat exchanger downstream of said turbine, and a second liquid-to-air heat exchanger downstream of said first liquid-to-air heat exchanger; and
   placing a liquid cycle subsystem in heat exchange relationship with said air cycle subsystem, said liquid cycle subsystem comprising said condenser, said reheater downstream of said condenser, said first liquid-to-air heat exchanger upstream of said condenser, and a second liquid-to-air heat exchanger downstream of said reheater, with said heat exchange relationship occurring at said first liquid-to-air heat exchanger, said second liquid-to-air heat exchanger, said condensers, and said reheaters,
   whereby said liquid cycle subsystem assists in removing water from said air cycle subsystem and a liquid output from said second liquid-to-air heat exchanger can cool said liquid load.

7. The method of claim 6, further comprising the step of condensing water vapor from said water vapor bearing air, said step of condensing occurring in said condenser.

8. The method of claim 6, further comprising the step of extracting condensed water vapor from said water vapor bearing air, said step of extracting occurring in a water extractor intermediate said condenser and said reheater.

9. The method of claim 6, further comprising the step of expanding a reheated air from said reheater.

10. The method of claim 6, further comprising the step of compressing said water vapor bearing air.

11. The method of claim 7, further comprising the step of cooling said water vapor bearing air in an air-to-air heat exchanger.

12. A liquid-to-air cycle system for conditioning water vapor bearing air, comprising:
    an air cycle subsystem comprising a liquid-to-air condenser, a liquid-to-air reheater downstream of said condenser such that said reheater can reheat a dehumidified air, and a turbine downstream of said reheater; and
    a liquid cycle subsystem in heat exchange relationship with said condenser and said reheater, said liquid cycle subsystem comprising said condenser and said reheater downstream of said condenser,
    whereby said reheater can recover thermal energy from said liquid cycle subsystem and provide a recovered thermal energy for use by said turbine.

13. The system of claim 12, wherein said air cycle subsystem further comprises a liquid-to-air heat exchanger downstream of said reheater.

14. The system of claim 12, wherein said air cycle subsystem further comprises a water extractor intermediate said condenser and said reheater.

15. The system of claim 12, wherein said air cycle subsystem comprises said reheater downstream of said condenser.

16. The system of claim 12, wherein said liquid cycle subsystem comprises said condenser and said reheater.

17. The system of claim 16, wherein said liquid cycle subsystem further comprises a liquid-to-air heat exchanger downstream of said condenser and said reheater.

18. The system of claim 16, wherein said liquid subsystem further comprises a plurality of liquid-to-air heat exchangers in flow communication with said reheater and said condenser.

19. A liquid-to-air cycle system for conditioning water vapor bearing air and cooling a liquid load, comprising:

an air cycle subsystem comprising a compressor, a liquid-to-air condenser downstream of said compressor, a liquid-to-air reheater downstream of said condenser, a turbine downstream of said reheater such that said turbine can recover heat of condensation and heat of sensible cooling from said reheater and use said heat to drive said compressor, a first liquid-to-air heat exchanger downstream of said turbine, and a second liquid-to-air heat exchanger downstream of said first liquid-to-air heat exchanger; and a liquid cycle subsystem in heat exchange relationship with said air cycle subsystem, said liquid cycle subsystem comprising said condenser, said reheater downstream of said condenser, said first liquid-to-air heat exchanger upstream of said condenser, and said second liquid-to-air heat exchanger, wherein said heat exchange relationship occurs at said condenser and at said reheater to produce said heat of condensation and heat of sensible cooling.

20. The system of claim 19, wherein said air cycle subsystem further comprises said first and second liquid-to-air heat exchangers downstream of said reheater.

21. The system of claim 19, wherein said air cycle subsystem comprises said first liquid-to-air heat exchanger upstream of said reheater.

22. The system of claim 19, wherein said liquid cycle subsystem comprises said second liquid-to-air heat exchanger downstream of said condenser.

23. The system of claim 22, wherein said liquid cycle subsystem comprises said second liquid-to-air heat exchanger downstream of said reheater.

* * * * *

UNITED STATES PATENT AND TRADEMARK OFFICE
CERTIFICATE OF CORRRECTION

PATENT NO. : 5,906,111
DATED : May 25, 1999
INVENTOR(S) : Clarence Lui

It is certified that error appears in the above-identified patent and that said Letters Patent is hereby corrected as shown below:

On the title page: Item [56]

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 2 | 6 | 9 | 1 | 2 | 7 | 4 | 10/12/54 | V. Whitney, et al | | |
| | | 3 | 0 | 9 | 7 | 5 | 0 | 4 | 7/16/63 | D. Quick, et al. | | |
| | | 5 | 5 | 5 | 3 | 4 | 6 | 1 | 9/10/96 | R. Hitzigrath, et al. | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 0 | 5 | 8 | 9 | 4 | 2 | 5 | 3/3/94 | EPO | | | |
| | WO | 91/ | 0 | 0 | 4 | 8 | 3 | | 1/10/91 | PCT | | | |
| | | | 9 | 1 | 4 | 1 | 2 | 4 | 12/28/62 | United Kingdom | | | |
| | | | 9 | 7 | 6 | 5 | 6 | 4 | 11/25/64 | United Kingdom | | | |

Signed and Sealed this

Seventh Day of November, 2000

Attest:

Attesting Officer

Q. TODD DICKINSON

Director of Patents and Trademarks